United States Patent Office 3,262,834
Patented July 26, 1966

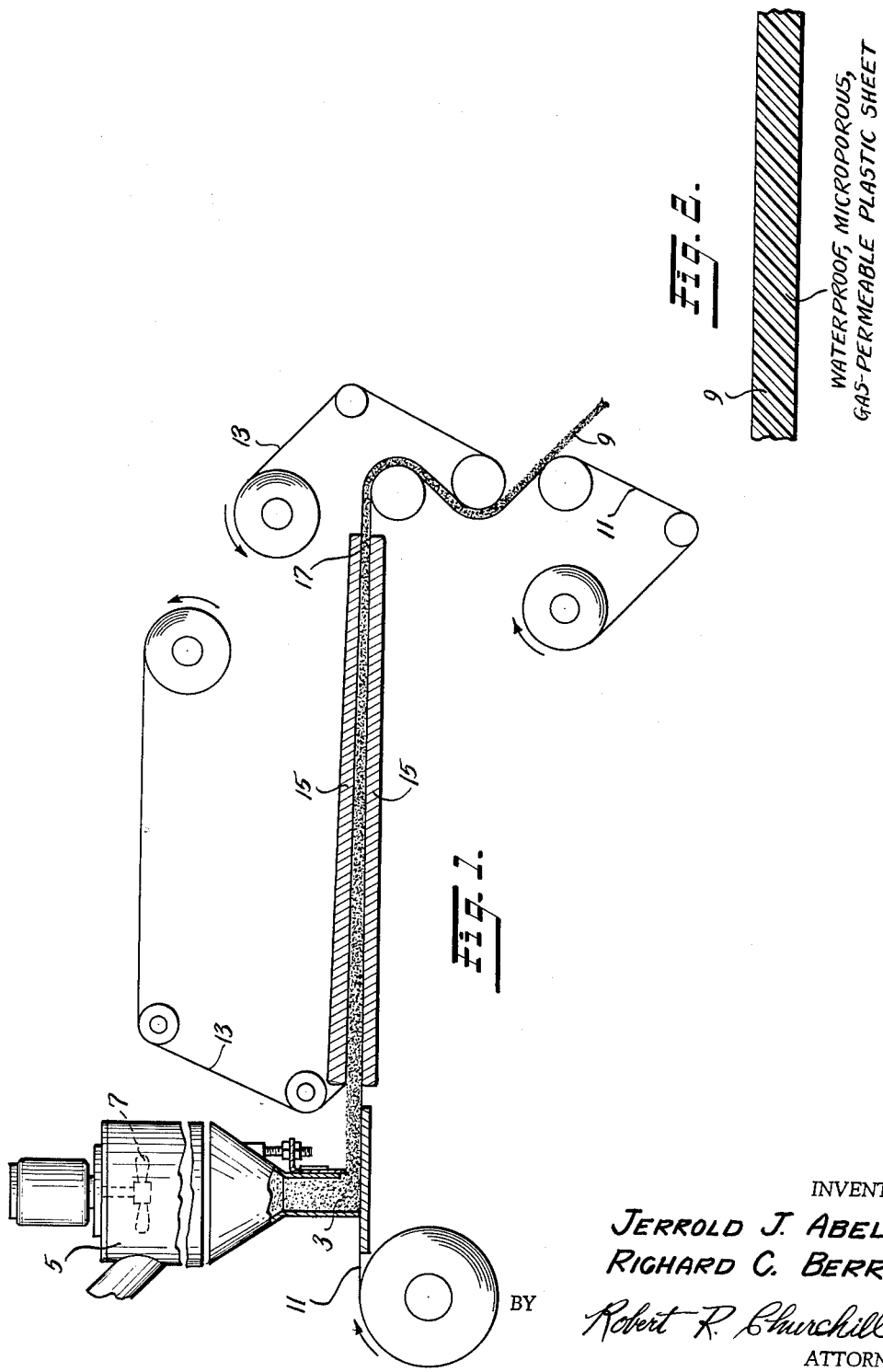

3,262,834
WATERPROOF GAS-PERMEABLE PLASTIC SHEET
Jerrold J. Abell, Putnam, and Richard C. Berry, Danielson, Conn., assignors to Rogers Corporation, Rogers, Conn., a corporation of Massachusetts
Filed Dec. 20, 1962, Ser. No. 245,998
7 Claims. (Cl. 161—159)

The present invention relates to a porous plastic structure and more particularly a plastic material which is very permeable to gases, such as, air and water vapor but which is also waterproof. The material of the present invention may be in the form of a self-supporting sheet, or it may be laminated to one or more layers of gas-permeable sheet material.

It is well known that plastic sheets are generally waterproof. However, the waterproof plastic sheets of the prior art have a low degree of permeability to air or water vapor. In uses for such sheets where human comfort is a factor, such as garments and all types of upholstery, air and water vapor are trapped between the plastic and the wearer causing considerable discomfort.

Plastic sheet materials have been made which are porous and gas-permeable, but these materials are not highly water-repellent. Efforts have been made to waterproof such porous materials without drastically reducing their gas permeability by treating the surface of the material. However, the compounds used in such treatment wear off with use, and the material quickly loses its water repellency.

It is, accordingly, an object of the present invention to provide a porous plastic structure which is very permeable to gases, such as air and water vapor, but which is also waterproof.

Another object of the present invention is to provide a waterproof, gas-permeable plastic sheet suitable for use in garments either by itself or as a layer of a composite material.

A further object of the present invention is to provide a waterproof, gas-permeable plastic structure wherein the agent or agents which impart waterproofness are incorporated throughout the structure and are, therefore, not lost with use.

Additional objects and advantages of the present invention will be apparent from the following detailed description thereof:

In Yarrison, application Serial No. 829,443, filed July 24, 1959, now Patent No. 3,067,469, and in Berry et al. application Serial No. 221,555, there are disclosed methods of making microporous structures which are gas-permeable. In accordance with the Yarrison application, granules of thermoplastic resin are distributed as a uniform layer on a resilient fibrous sheet. A second resilient fibrous sheet is then placed on top of the resin granules, and the assembly is passed between hot plates defining a passage of diminishing thickness to compress the assembly and sinter the resin particles. As a result of this treatment, the resin particles are formed into a strong uniformly sintered sheet.

The Berry et al. application comprises an improvement over the Yarrison application and discloses a method of applying various surface treatments to a sintered plastic material during its manufacture including either mechanically bonding a fabric to the sintered sheet and/or applying an embossed surface to the sheet during its manufacture.

While the porous permeable materials produced in the manner set forth in Yarrison application, Serial No. 829,443, and Berry et al. application, Serial No. 221,555, are highly useful in making garments, these materials do not possess any great degree of water repellency. According to the present invention it has been discovered that the resin particles may be formulated so as to give, after sintering, a microporous sheet which, in addition to being gas-permeable, possesses not only a high degree of water repellency but is also waterproof.

In previously mentioned copending applications, the materials used were in the form of thermoplastic granules which could be blended with plasticizers, fillers, pigments, dyes and the like. According to the present invention a waterproofing system compatible with the resin to be used is mixed with a plasticizer and then this mixture may be blended with the thermoplastic granules in a very fast agitator which generates heat during the blending operation. This blending procedure enables the plasticizer to soak into the resin carrying the waterproofing system components along with it. Good results have been obtained when the compositions to be blended contain 30 to 100 parts by weight of plasticizer per hundred parts by weight of resin and 1.0 to 4.0 parts by weight of water repellents per hundred parts by weight of resin. The composition may also include stabilizers, fillers, pigments and dyes, as desired. Other techniques for dry compounding of thermoplastic resins may be used alternatively.

Suitable thermoplastic materials include vinyl resins and other water-insoluble thermoplastic resins which are either flexible by nature or which can be made flexible by suitable agents. Particularly good results are obtained with vinyl resins including vinyl homopolymers, such as polyvinyl chloride, and vinyl copolymers, such as copolymers of vinyl chloride and vinyl acetate. Copolymers of vinyl chloride and vinyl acetate are preferred for use in the invention. These preferred copolymers will contain from 90 to 97% by weight of vinyl chloride.

The plasticizer may be any plasticizer suitable for use with the selected resin. When a vinyl resin is used suitable plasticizers have been found to include dioctyl phthalate, dioctyl sebacate, N-octyl-N-decyl adipate, N-octyl-N-decyl phthalate, polyester plasticizers and monomeric, epoxy-ester type plasticizers.

The waterproofing system of the present invention can contain any water repellent compatible with the resin and plasticizers used. Good results have been obtained by using water repellents based on silicones, fluorocarbons and long chain nitrogen complexes, such as the materials marketed under the name "Zelan." Particularly good results are obtained when the waterproofing system used is a mixture of Zelan and a fluorocarbon repellent.

The stabilizers which may be incorporated include barium-cadmium-zinc complexes, such as that marketed under the name "6–V–6A" and epoxy stabilizers, such as that marketed under the name "Ferro 900."

The composition contemplated for use in this invention includes the following ingredients mixed in the recited proportions:

| Component: | Parts by weight per hundred parts by weight of resin |
| --- | --- |
| Thermoplastic resin | 100 |
| Plasticizers | 30 to 100 |
| Water repellent | 1.0 to 4.0 |
| Stabilizer | 0 to 10.0 |
| Pigment | 0 to 5.0 |
| Filler | 0 to 25.0 |

The gas permeability of the final product may be varied, as disclosed in the aforesaid Yarrison application, by controlling the reduction in thickness of the resin particle layer during the application of heat and pressure. Preferred ratios of reduction in thickness are between 4 to 1 and 2 to 1 with gas permeability decreasing with increasing compaction. Samples have been prepared having air permeability of from 3 to 20 cu. ft./min./sq. ft. at a pressure difference of 25 inches of water.

The following examples as described in relation to the accompanying sheet of drawings wherein FIGURE 1 is a schematic representation of apparatus suitable for preparing the sheet material and FIGURE 2 is a schematic cross sectional view of the sheet material. These examples are given only by way of illustration and are not intended to in any way limit the scope of the invention.

EXAMPLE I

A dry blend of the following composition was made:

| | Parts by weight per hundred parts by weight of resin |
|---|---|
| Copolymer of polyvinyl chloride (97%) and polyvinyl acetate (3%) | 100 |
| Normal octyl normal decyl adipate | 52 |
| Normal octyl normal decyl phthalate | 22 |
| Monoplex S-73, monomeric, epoxy-ester type plasticizer | 6 |
| 6-V-6A, barium-cadmium-zinc complex stabilizer | 2 |
| Pigment | 2 |
| G.E. SS 4024, water-repellent, 50% active silicones, 50% solvent | 3 |

The above recited mixture containing resin particles 3 was placed in blending chamber 5 and the blending was conducted by a high speed agitator 7 and continued until substantially all of the plasticizer had been worked into the resin carrying the active silicone material along with it, the solvent originally present being evaporated by the heat generated by the agitator. The treated resin particles 3 were then transferred to carrier sheet 11 and were then formed into a microporous sheet material 9 by compressing and sintering between resilient carrier sheet 11 and top sheet 13 and the assembly was then passed between hot plates 15 defining a passage 17 of diminishing thickness to compress the assembly and sinter the particles in the manner disclosed in United States application, Serial No. 829,443.

The resulting microporous sheet material was repellent to water in the liquid state, but had a vapor transmission rate (grams/24 hr./100 in.$^2$ at 100° F. and 95% relative humidity) of 90 as compared to 2.6 for a similar non-porous vinyl film.

EXAMPLE II

A series of microporous sheet materials were prepared following the procedure of Example I, but substituting various water repellents for the silicone based water repellent (G.E. SS 4024). Treated particles were prepared containing the following eight water repellents:

(1) 2.0 phr. of Zelan S (cationic aqueous dispersion of a water repellent long chain nitrogen complex);
(2) 3.0 phr. of Zelan S;
(3) 2.0 phr. of Zelan S and 2.0 phr. of FC-205 (fluorocarbon water repellent);
(4) 2.0 phr. of Zelan S and 1.5 phr. of FC-205;
(5) 2.0 phr. of Zelan S and 1.0 phr. of FC-205;
(6) 2.0 phr. of Zelan S and 0.5 phr. of FC-205;
(7) 2.0 phr. of Zelan S and 0.25 phr. of FC-205; and
(8) 2.0 phr. of Zelan S and 0.10 phr. of FC-205.

As used, "phr." is intended to mean parts by weight per hundred parts by weight of resin.

From each formulation of treated resin particles samples were prepared having air permeabilities (cu. ft./min./sq. ft. at Δ P equals 25 in. of water) of 3, 5 and 10. Each of the samples was tested for waterproofness by the dynamic head test disclosed in ASTM D583-58. The results of these tests are summarized in Table I and they indicate that an increased water repellency is obtained by using a mixture of the two types of agents and that a water repellent formula of 2 phr. of Zelan S and 1 phr. of the fluorocarbon FC-205 yields a particularly effective water repellent product.

Table 1

| Water Repellent in phr. of— | | Air Permeability, cu. ft./min./sq. ft. at Δ P=25 in. H²O | Dynamic Head Test Centimeters |
|---|---|---|---|
| Zelan S | FC-205 | | |
| 2.0 | 0 | 3 | 60 |
| | | 5 | 60 |
| | | 10 | 50 |
| 3.0 | 0 | 3 | 60 |
| | | 5 | 60 |
| | | 10 | 50 |
| 2.0 | 2.0 | 3 | 80 |
| | | 5 | 80 |
| | | 10 | 60 |
| 2.0 | 1.5 | 3 | 80 |
| | | 5 | 80 |
| | | 10 | 70 |
| 2.0 | 1.0 | 3 | 80 |
| | | 5 | 80 |
| | | 10 | 80 |
| 2.0 | 0.5 | 3 | 80 |
| | | 5 | 80 |
| | | 10 | 70 |
| 2.0 | 0.25 | 3 | 70 |
| | | 5 | 70 |
| | | 10 | 60 |
| 2.0 | 0.10 | 3 | 60 |
| | | 5 | 60 |
| | | 10 | 60 |

Comparative static head tests at 50 cm. of water were then run according to the procedure described in ASTM D583-58 between a sample having a water-repellent constituent consisting of 2 phr. of Zelan S and a sample having a water-repellent constituent consisting of a mixture of 2 phr. of Zelan S and 1 phr. of the fluorocarbon FC-205, each sample having an air permeability of 3. As shown in Table 2, the static head test results for the sample containing the water-repellent mixture of Zelan S and FC-205 was over 60 minutes, while the results for the sample in which Zelan S alone was used was only 15 minutes. Resistance of 60 minutes or longer to the 50 cm. static head test is generally accepted as criteria of waterproofness.

Table 2

| Formula | Air Permeability, cu. ft./min./sq. ft. at ΔP=25 in. H²O | Static Head Test Minutes at 50 cm. |
|---|---|---|
| 2.0 phr. Zelan S | 3 | 15 |
| 2.0 phr. Zelan S, 1.0 phr. FC-205 | 3 | 60+ |

It will be apparent that many modifications and variations may be effected without departing from the scope of the novel concepts of the present invention, and the illustrative details disclosed are not to be construed as imposing unnecessary limitations on the invention.

Having thus described the invention, what is claimed is:

1. A waterproof, microporous, gas-permeable plastic sheet having a water repellent incorporated throughout the structure of the sheet comprising plasticizer-water repellent impregnated thermoplastic resin granules sintered into said sheet, said sheet having an air permeability of 3-20 ft.$^3$/min./ft.$^2$ at a pressure difference of 25 inches of water, and waterproofness measured as a resistance for at least 15 minutes to a static head of 50 cm. of water.

2. A waterproof microporous permeable plastic sheet as defined in claim 1 wherein a fibrous sheet is bonded to the sintered thermoplastic resin sheet material.

3. A sheet as claimed in claim 1 wherein said water repellent is a silicone based water repellent.

4. A sheet as claimed in claim 1 wherein said water repellent is a mixture of a fluorocarbon and a long chain nitrogen compound.

5. A sheet as claimed in claim 1 wherein said thermoplastic resin is a copolymer of vinyl chloride and vinyl acetate.

6. A sheet as claimed in claim 1 wherein said copolymer contains 90 to 97% by weight of vinyl chloride.

7. A waterproof, microporous, gas-permeable plastic sheet having a water repellent incorporated throughout the structure of the sheet comprising sintered thermoplastic resin granules which have been blended with 30–100 parts by weight per 100 parts by weight of resin of a plasticizer and 1–4 parts by weight per 100 parts by weight of resin of a water repellent mixture under heat generating conditions whereby said plasticizer-water repellent mixture impregnates said granules, said sheet having an air permeability of 3–20 ft.³/min./ft.² at a pressure difference of 25 inches of water, and waterproofness measured as a resistance for at least 15 minutes to a static head of 50 cm. of water.

References Cited by the Examiner

UNITED STATES PATENTS

| | | | |
|---|---|---|---|
| 2,526,311 | 10/1950 | Wilson | 161—159 |
| 2,943,008 | 6/1960 | Saunders | 161—159 |
| 2,960,727 | 11/1960 | Bradshaw et al. | 264—126 |
| 2,963,746 | 12/1960 | Webb et al. | 264—126 |
| 3,004,294 | 10/1961 | Richard et al. | 264—127 |
| 3,067,469 | 12/1962 | Yarrison | 264—112 |
| 3,094,585 | 6/1963 | Rudner | 264—127 |

FOREIGN PATENTS 556,942  5/1958  Canada.

EARL M. BERGERT, *Primary Examiner.*

H. F. EPSTEIN, *Assistant Examiner.*